No. 722,458. PATENTED MAR. 10, 1903.
A. C. SARGENT.
SPEED CHANGING AND REVERSING MECHANISM.
APPLICATION FILED NOV. 21, 1902.
NO MODEL.
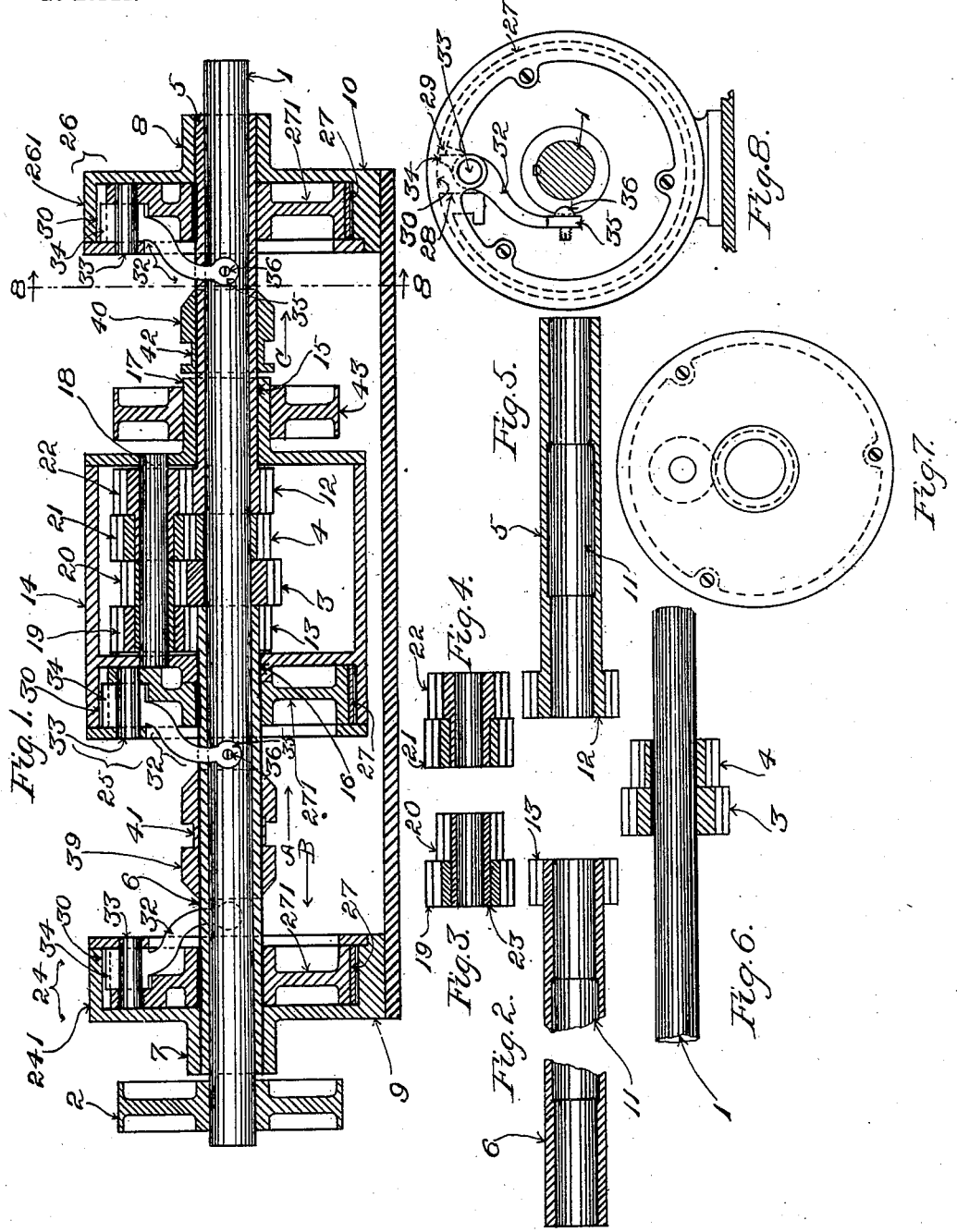
WITNESSES:
Oscar F. Hill
Edith J. Anderson
INVENTOR.
Allan C. Sargent
BY Macleod Calver
& Randall
ATTORNEYS.

UNITED STATES PATENT OFFICE.

ALLAN CAMERON SARGENT, OF GRANITEVILLE, MASSACHUSETTS.

SPEED-CHANGING AND REVERSING MECHANISM.

SPECIFICATION forming part of Letters Patent No. 722,458, dated March 10, 1903.

Application filed November 21, 1902. Serial No. 132,212. (No model.)

*To all whom it may concern:*

Be it known that I, ALLAN CAMERON SARGENT, a citizen of the United States, residing at Graniteville, in the county of Middlesex, State of Massachusetts, have invented a certain new and useful Improvement in Speed-Changing and Reversing Mechanisms, of which the following is a specification, reference being had therein to the accompanying drawings.

The invention has reference to those power-transmitting mechanisms whose object is to furnish means by which the relative speed of the driven member relative to the driving member of the transmitting system may be varied within certain predetermined limits or by which the relative direction of rotation of said driven member may be reversed, if desired.

More particularly the invention hereinafter described relates to that class of power-transmitting mechanisms wherein the variation in speed and the reversal of the direction of rotation is effected by the agency of planetary gearing suitably controlled by appropriate clutch or braking mechanism.

Referring to the drawings, Figure 1 shows a longitudinal view of power-transmitting mechanism embodying my invention, the said mechanism being represented principally in longitudinal section in order to show the interior construction. Figs. 2 to 6 show detailed views of parts of the gearing employed by me. Fig. 7 is an exterior elevation of the casing containing the gearing by which the changes in speed and direction are effected. Fig. 8 is a view in vertical section on the plane indicated by the dotted line 8 8, Fig. 1.

Referring to the drawings, 1 is the shaft on which the power-transmitting and speed-varying mechanism is mounted and to which the varying speeds are to be imparted. The power from the said shaft 1 is delivered to the point desired by means of a pulley 2 or other similar power-transmitting device fixedly mounted upon the said shaft 1, preferably at one end thereof, as shown. Two gears 3 and 4, preferably of different sizes, are keyed side by side to the shaft 1, preferably at or near its center. (See Figs. 1 and 6.) Sleeves 5 and 6 (shown separately in Figs. 2 and 5) are loosely carried by and freely revoluble upon the shaft 1. The said sleeves extend, one on each side of the gears 3 and 4, toward the end of the shaft, each being long enough to pass through the bearings 7 and 8, which are provided for them in the opposite stands 9 and 10, respectively. Each of the said sleeves 5 and 6 is preferably interiorly counterbored for a portion of its length, as at 11, Figs. 2 and 5, in order to provide a lodging-place for lubricant. On the inner end of each of the sleeves 5 and 6 a gear is mounted, that carried by the said end of sleeve 5 being designated 12 and that carried by sleeve 6 being designated 13. The gears 12 and 13 are located adjacent to the gears 3 and 4, at opposite sides of the latter. A casing 14 covers up and conceals the said gears 3, 4, 12, and 13 from sight, also protecting the same from dust or injury. The said casing is furnished at its opposite ends with heads having hubs fitted to and freely revoluble upon the exteriors of the sleeves 5 and 6, the bearing between the said casing and the sleeve 5 being at 15, while the casing bears upon sleeve 6 at 16. On one of the said hubs of the casing 14, as 17, a driving-pulley 40 or a sprocket-wheel, gear, or other power-receiving device may be made fast; but the said device may be, if desired, applied to the exterior of the casing 14.

Suitably mounted in the casing 14 is a shaft or stud 18, which furnishes a support and bearing for the gears 19, 20, 21, and 22. Gears 21 and 22 are connected together by any well-known method of mechanical construction, as shown in Figs. 1 and 4, and thus are caused to revolve in unison upon shaft or stud 18. They turn upon said shaft or stud independently of gears 19 and 20. The gears 19 and 20 are fixed together, as shown in Figs. 1 and 3, and revolve in unison upon shaft or stud 18, independently of gears 21 and 22. The gears 19 and 20 mesh with the gears 13 and 3 upon the sleeve 6 and shaft 1, respectively. Similarly the gears 21 and 22 engage with gears 4 and 12 upon shaft 1 and sleeve 5, respectively. The relative pitch diameters of gears 3, 4, 12, 13, 19, 20, 21, and 22 are controlled by the consideration of the variations of speed which it is desired to secure by the use of the power-transmitting mechanism. By way of illustration gear 13 may have twelve teeth, gear 19, meshing therewith, may have twelve, gear 20 may have eight, gear 3 may have sixteen, gear 4 may have 12, gear 21 may have twelve, gear 22 may have eleven, and gear 12 may have thirteen.

The control of the mechanism above described, so as to produce the speed desired, is effected by the proper manipulation of clutches 24, 25, and 26. The said clutches may be of any suitable construction; but preferably I employ the form of friction-clutch which is shown in the accompanying drawings and fully described, as well as claimed, in my application for a United States patent therefor, filed November 21, 1902, and serially numbered 132,213. To briefly explain the clutches and the method of throwing their respective members into engagement with each other, it may be stated that they are composed of coacting members, one of which carries upon its periphery a split friction-ring 27. (See more particularly Fig. 8.) The said ring is expanded when desired by spreading apart its ends 28 and 29, Fig. 8, so as to cause it to bear upon the contiguous surface of the other clutch member. In the case of clutches 24 and 26 the clutch members against which the friction-rings 27 27 are forced when said rings are expanded are stationary, being the fixed laterally-projecting flanges 241 261, which form parts of the stands 9 and 10, which furnish supports for the opposite ends of shaft 1. In the case of clutch 25 this member is a portion of the revolving casing 14. In each clutch the member by which the split friction-ring is carried is a disk 271. The disks or carriers 271 271 of the clutches 24 and 25 are keyed or splined upon sleeve 6. That of clutch 26 is keyed or splined upon sleeve 5. The expansion of the split friction-ring 27 of each clutch is effected by means of lever 32, pivoted on a stud 33, mounted in the disk or carrier 271. The lever 32 has a short arm 34 and a long arm 35. The short arm 34 of said lever is arranged to bear against the free end 29 of ring 27, the other end of said ring being connected with disk or carrier 271. The longer arm 35 extends radially inward and is furnished with a preferably adjustable contact-point 36. For the purpose of operating the levers 32 32 32 cams or cones 39 and 40 are mounted upon the exteriors of sleeves 6 and 5, respectively. The said cams or cones are movable upon the exteriors of the sleeves 6 and 5, respectively, in the direction of the lengths of said sleeves by means of handles or shippers (not shown in the drawings) engaging by means of any of the well-known devices for that purpose in the annular grooves 41 and 42 of said cams or cones. Both ends of the sliding cam 39 are beveled or cone-shaped, as shown. One end of sliding cam 40, or that nearest the clutch 26, is likewise beveled or cone-shaped. When the said sliding cams 39 and 40 are forced toward the clutches which they control, their beveled or cone-shaped ends come in contact with the contact-points 36 36, &c., carried by the levers 32 32, &c., operating said levers to close the clutches.

I will now proceed to explain the manner in which I make use of the mechanism above described in order to produce a variation of the speed or reversal of the direction of rotation of shaft 1. This desired result is secured by a manipulation of the clutches 24, 25, and 26. When the sliding cams are in the position shown in Fig. 1, the three clutches 24, 25, and 26 are open or disengaged. The casing 14, rotating at a uniform speed, consequently transmits no power to shaft 1, the sleeves 5 and 6 merely revolving freely on shaft 1 relatively to the casing 14 in accordance with the law of planetary gearing as effected by the proportions of the gearing employed. When it is desired to cause shaft 1 to rotate at a speed identical with that of the casing 14, the sliding cam or cone 39 is moved in the direction of arrow A, throwing clutch 25 into engagement. This will lock the casing 14 to the sleeve 6, so that both will turn in unison. In consequence, the gears 13 and 19, 20, and 3 will be unable to turn upon their respective axes, and the shaft 1 will be compelled to rotate in unison with the casing 14. To give a slow speed to the shaft 1, the sliding cam or cone 39 is moved in the direction of arrow B. This will throw in or close clutch 24 and cause sleeve 6 to be fixed with respect to the stand containing the bearing 7. In consequence, the gear 12 will become stationary, and the rotation of casing 14, carrying the gears 19 and 20 around the shaft 1, will cause gear 3, with the shaft 1, to which it is keyed, to be given a rotation in the same direction as that of the casing 14, but slower than it, the relative rates of rotation depending upon the relative sizes of the gears used. The reversal of the direction of rotation of shaft 1 relatively to that of the casing 14 is effected by moving the sliding cam or cone 40 in the direction of the arrow C, so as to cause the engagement or closing of clutch 26, thereby locking the sleeve 5 to the stand carrying the bearing 8. The result will be to render gear 12 fixed and, provided gears 4, 12, 21, and 22 are correctly proportioned, to cause a direction of rotation of shaft 1 reverse to that of casing 14, the degree of speed-reversal depending upon the relative sizes of the gearing used.

In the construction above it should be observed that either the slow or the full speed may be obtained by the manipulation of one lever or shipper-handle—namely, that controlling the sliding cam or cone 39—while a separate shipper is necessary in order to manipulate the cam or cone 40 so as to obtain the reverse speed.

While I have above described the use of friction-clutches as the means of securing the speed desired, it is to be understood that any equivalents therefor, as band-brakes or the like, may be employed.

I have for the sake of simplicity and clearness in the drawings and description shown and described but one shaft 18 and one set of planetary gears 19, 20, 21, and 22. Ordinarily in practice for the purpose of securing a better balance and a stronger drive two or more of the said shafts with corresponding sets of gears will be employed.

What I claim is—

1. A speed-varying and reversing mechanism comprising, a central shaft, a pair of gears fixed thereon, sleeves revoluble on the said shaft at opposite sides of said pair of gears, a gear at the inner end of each sleeve, a casing, two pairs of planetary gears carried by the said casing, each pair meshing with one of the said fixed gears and with the gear on one of the sleeves, means whereby the respective sleeves may be locked from rotation, and a clutch coöperating with said casing and one of said sleeves, whereby the casing and said sleeve may be locked together, substantially as described.

2. A speed-varying and reversing mechanism, comprising, in combination, a central shaft, a pair of gears fixed upon an intermediate portion of the length thereof, sleeves mounted upon said shaft at opposite sides of said pair of fixed gears, constituting bearings for said shaft, a gear at the inner end of each sleeve, a rotating casing mounted to turn concentrically with said sleeves and shaft, two sets of planetary gears mounted in said casing and connecting the respective gears of said fixed pair with the respective gears of the sleeves, a clutch device coöperating with said casing and one of said sleeves, whereby the said casing and sleeve may be locked together, and means coöperating with the respective sleeves to lock the latter from rotation, substantially as described.

3. A speed-varying and reversing mechanism comprising, a central shaft, a pair of gears fixed thereon, sleeves revoluble on the said shaft at opposite sides of said pair of gears, a gear at the inner end of each sleeve, a casing, two pairs of planetary gears carried by the said casing, each pair meshing with one of said fixed gears and with the gear on one of the sleeves, fixed supports, clutches applied to said supports and respectively engaging with said sleeves, whereby to lock either thereof from rotation, and a third clutch coöperating with said casing and one of said sleeves, whereby the two may be locked together, substantially as described.

4. A speed-varying and reversing mechanism comprising, in combination, a central shaft, a pair of gears fixed upon an intermediate portion of the length thereof, sleeves mounted upon said shaft at opposite sides of said pair of fixed gears, constituting bearings for said shaft, a gear at the inner end of each sleeve, a rotating casing mounted to turn concentrically with said sleeves and shaft, two sets of planetary gears mounted in said casing connecting the respective gears of said fixed pair with the respective gears of the sleeves, standards containing bearings for said sleeves, a clutch intermediate said casing and one of said sleeves, and clutches applied to the respective standards and coöperating with the respective sleeves to lock the latter from rotation, substantially as described.

In testimony whereof I affix my signature in presence of two witnesses.

ALLAN CAMERON SARGENT.

Witnesses:
CHAS. G. SARGENT,
EDW. F. CONNORS.